US012176565B1

(12) United States Patent
Kanarek

(10) Patent No.: US 12,176,565 B1
(45) Date of Patent: Dec. 24, 2024

(54) MOUNTING SYSTEM FOR A CINEMATOGRAPHY BATTERY

(71) Applicant: Core SWX, LLC, Plainview, NY (US)

(72) Inventor: Ross Kanarek, Plainview, NY (US)

(73) Assignee: Core SWX, LLC, Plainview, NY (US)

( * ) Notice: Subject to any disclaimer, the term of this patent is extended or adjusted under 35 U.S.C. 154(b) by 0 days.

(21) Appl. No.: 18/588,358

(22) Filed: Feb. 27, 2024

(51) Int. Cl.
*H01M 50/262* (2021.01)
*H01M 50/204* (2021.01)
*G03B 17/02* (2021.01)

(52) U.S. Cl.
CPC ....... *H01M 50/262* (2021.01); *H01M 50/204* (2021.01); *G03B 17/02* (2013.01); *H01M 2220/30* (2013.01)

(58) Field of Classification Search
CPC ............. H01M 50/262; H01M 50/204; H01M 2220/30; G03B 17/02
See application file for complete search history.

(56) References Cited

U.S. PATENT DOCUMENTS

| | | | | |
|---|---|---|---|---|
| 3,321,226 | A * | 5/1967 | De Claire | E05B 81/20 292/201 |
| 3,432,967 | A * | 3/1969 | Horst | G03B 17/02 49/386 |
| 4,593,945 | A * | 6/1986 | Arute | F24C 15/022 292/216 |
| 7,121,854 | B2 * | 10/2006 | Buck | H01M 50/262 439/160 |
| 2020/0119318 | A1 * | 4/2020 | Okuoka | H01M 50/271 |
| 2020/0295506 | A1 * | 9/2020 | Marx | H01R 13/422 |
| 2021/0078704 | A1 * | 3/2021 | Blakstad | B60L 50/66 |
| 2021/0083237 | A1 * | 3/2021 | Cherry | H01M 50/24 |

* cited by examiner

*Primary Examiner* — Michael L Dignan
(74) *Attorney, Agent, or Firm* — Shore IP Group, PLLC; Sean R. Wilsusen

(57) ABSTRACT

A cinematography battery includes a housing and a mounting assembly. The mounting assembly is disposed at least partially within the housing and includes a body and a block. The body is configured to move relative to the housing. The block is operably coupled to the body and is configured to move relative to the body. At least a portion of the mounting assembly is configured to selectively engage a battery mount to couple the battery to the battery mount.

13 Claims, 6 Drawing Sheets

MOUNTING SYSTEM FOR A CINEMATOGRAPHY BATTERY

FIELD

The present disclosure relates to mounting system for a cinematography battery and, more particularly, to a battery that selectively engages a battery mount and makes an audible sound upon proper engagement therewith. The present disclosure also relates to associated methods of engaging the battery with the battery mount.

BACKGROUND

Batteries, such as rechargeable batteries, that are removable from a battery mount are commonly used to provide portable power. Battery mounts may be included on various types of devices that utilize power.

In the field of cinematography, audiovisual equipment, such as video cameras, for instance, often includes battery mounts. Such audiovisual equipment used in cinematography is often power hungry, partly because of larger imaging sensors, as well as the advent of brighter output LED lighting, etc. High-performance batteries are commonly used to supply power to this type of equipment.

It can be challenging to properly engage a battery, such as a cinematography battery, to a battery mount due to a variety of factors. Initially, there is often no indication provided to the user to relay any information regarding when a battery successfully engages its battery mount. Moreover, it is not necessarily accurate to assume that the battery is properly engaged with the battery mount because power is being transferred from the battery to the piece of equipment connected to the battery mount. That is, an electrical connection can be established between a battery and a piece of equipment when the battery is not properly mounted to the battery mount.

Further, since high-performance batteries may be heavier than typically-performing batteries, it can be challenging to properly engage the battery with the battery mount, especially when the audiovisual equipment that includes the battery mount is in an elevated position, such as on the shoulder of the operator.

Moreover, a clicking sound may indicate a proper connection between a battery and a battery mount. However, even in circumstances where a clicking sound is present, the sound is often quiet. In environments that commonly have a lot of inherent noise (such as in remote filming locations that utilize loud generators), such a quiet clicking sound is inaudible and thus meaningless.

Loose or incorrectly attached batteries can lead to sudden disconnections, potentially causing damage to the camera or data loss, for instance, especially during critical shooting moments. Thus, a securely mounted battery reduces the risk of unexpected power interruptions, ensuring a reliable and uninterrupted workflow.

Further, camera batteries, like other electronic component, have specific electrical contacts and connections. Correctly mounting the battery ensures that these contacts align correctly with the camera's terminals, allowing for a stable and consistent power supply. This consistency is essential for maintaining the camera's functionality, preventing issues like sudden power loss or erratic behavior during video sessions.

Additionally, a properly mounted battery is less susceptible to damage caused by accidental knocks, bumps, or falls. Securely attaching the battery to its mount helps absorb shocks and vibrations, safeguarding the battery and preventing potential damage to its internal components. This is especially important when working in dynamic or fast-paced shooting environments.

Thus, the proper connection between a battery and its mount ensures operational readiness, and optimizes the safety, and performance of both the battery and the audiovisual equipment as well.

SUMMARY

Batteries, such as rechargeable batteries, that are removable from a battery mount are commonly used to provide portable power in the cinematic industry. Battery mounts (e.g., battery mount plates) are typically included on various pieces of equipment, such as video cameras. However, it is often challenging to determine when a battery is properly engaged with its mount.

Provided in accordance with aspects of the present disclosure is a cinematography battery including a housing and a mounting assembly. The mounting assembly is disposed at least partially within the housing and includes a body and a block. The body is configured to move relative to the housing. The block is operably coupled to the body and is configured to move relative to the body. At least a portion of the mounting assembly is configured to selectively engage a battery mount to couple the battery to the battery mount.

In an aspect of the present disclosure, the block is pivotable relative to the body.

In an aspect of the present disclosure, the block is rotatable relative to the housing.

In an aspect of the present disclosure, the block is pivotable about a pin disposed on the body.

In an aspect of the present disclosure, the block includes a finger configured to slidably engage a slot defined in the body. In an aspect of the present disclosure, the slot forms a curved path.

In an aspect of the present disclosure, the finger of the block is made from metal.

In an aspect of the present disclosure, a portion of the body defining a first end of the slot is made from metal.

In an aspect of the present disclosure, the mounting assembly includes a first biasing member biasing the finger of the block toward the first end of the slot.

In an aspect of the present disclosure, the mounting assembly includes a second biasing member biasing the body in a first direction relative to the housing.

Provided in accordance with aspects of the present disclosure is a battery configured to selectively engage a battery mount. The battery includes a housing and a mounting assembly. The mounting assembly is disposed at least partially within the housing and includes a body and a block. The body is configured to move relative to the housing between a first position and a second position. The block is disposed on the body and is pivotable relative to the body between a first position and a second position. A predetermined amount of movement of the block from its first position toward its second position causes the body to move from its first position toward its second position.

In an aspect of the present disclosure, the mounting assembly includes a first biasing member biasing the block toward its first position.

In an aspect of the present disclosure, the mounting assembly includes a second biasing member biasing the body toward its first position. The first biasing member is movable relative to the second biasing member.

In an aspect of the present disclosure, the body is configured to slide linearly relative to the housing.

In an aspect of the present disclosure, the block includes a finger configured to engage a slot defined in the body.

In an aspect of the present disclosure, the mounting assembly includes a first biasing member biasing the block toward its first position, such that when the block is in its first position, the finger is in contact with a portion of the body defining a first end of the slot, and such that an audible sound is made when the finger makes contact with the portion of the body defining the first end of the slot.

Provided in accordance with aspects of the present disclosure is a battery configured to selectively engage a battery mount. The battery includes a housing and a mounting assembly. The mounting assembly is disposed at least partially within the housing and includes a block. The block is movable in a first direction relative to the housing and movable in a second direction relative to the housing. The first direction is different than the second direction, and the first direction is non-co-axial with the second direction.

In an aspect of the present disclosure, the first direction is along a linear path, and the second direction is along a curved path.

In an aspect of the present disclosure, the mounting assembly includes a first biasing member biasing the block in the first direction.

In an aspect of the present disclosure, the mounting assembly includes a second biasing member biasing the block in the second direction.

BRIEF DESCRIPTION OF THE DRAWINGS

Various aspects and features of the present disclosure are described hereinbelow with reference to the drawings wherein.

DETAILED DESCRIPTION

Figure 1:
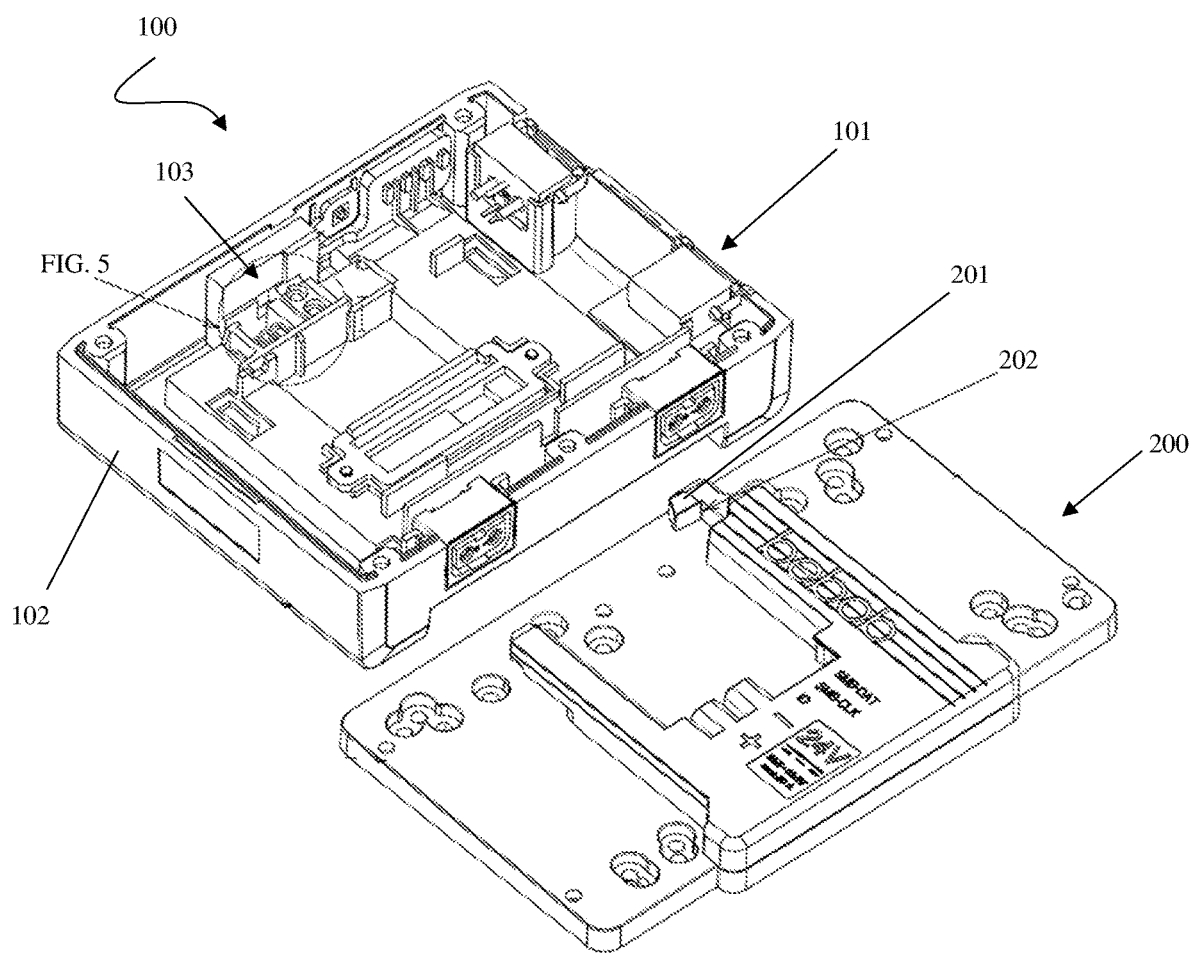
FIG. 1 is a perspective view of portions of a cinematography battery separated from a battery mount according to aspects of the present disclosure.
Figure 2:
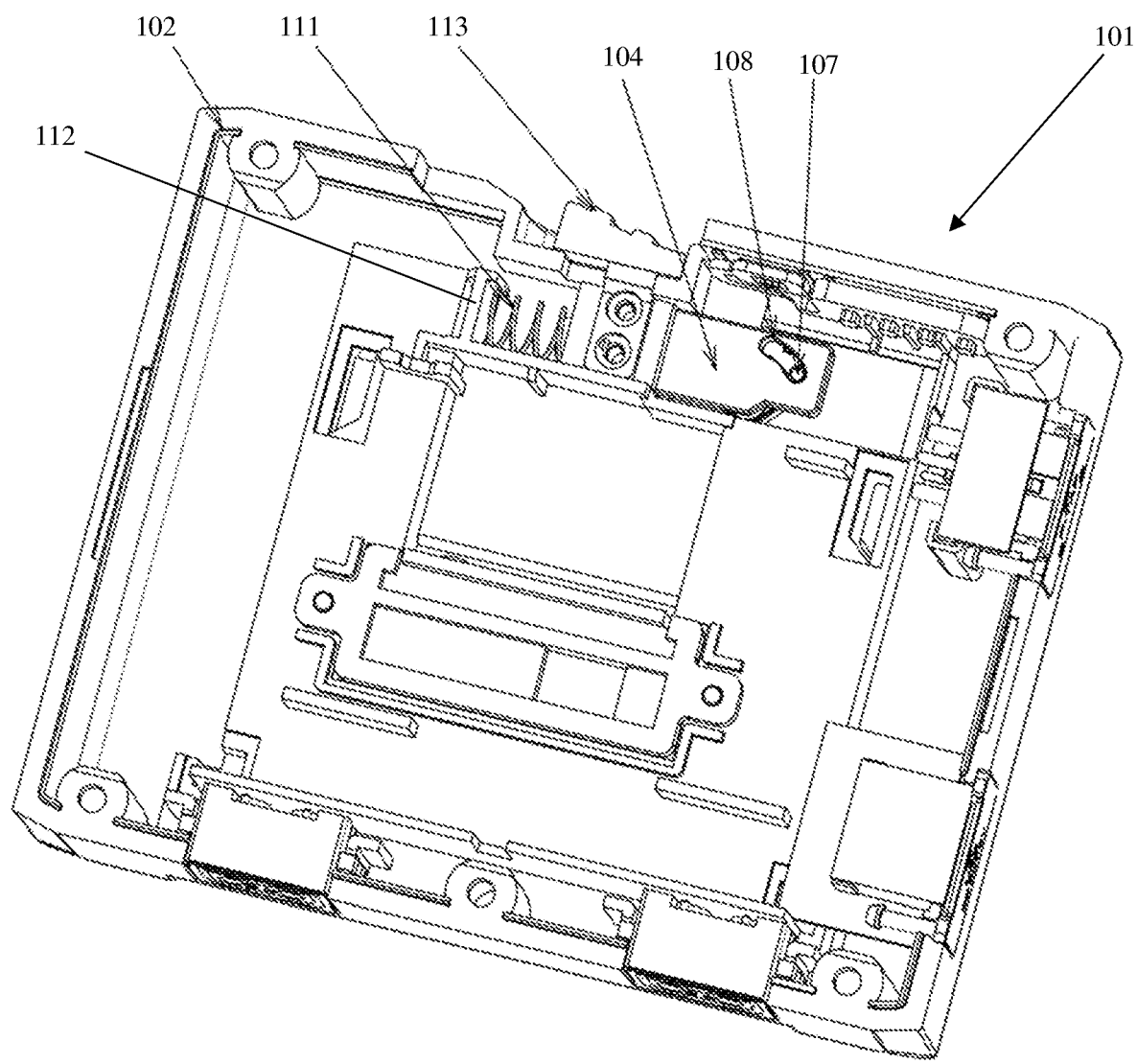
FIG. 2 is a perspective view of portions of the cinematography battery of FIG. 1.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

The phrases "mount plate," "mounting plate," and "battery mount plate" may be used interchangeably herein. The phrases "battery," "battery pack," and "pack" may be used interchangeably herein.

The ability to securely and reliably engage a battery with a battery mount is imperative in the video and cinema production industry, for instance. Additionally, the ability to determine when a battery is properly engaged with a battery mount is also frequently desired.

During the production and filming of motion pictures, for example, cinematic cameras and lighting often have high power demands which require the supply of high voltage power. While removable and rechargeable high voltage batteries may be available to provide the necessary power, the weight and size of the batteries and the various types of battery mounts, for example, may make the proper engagement between the battery and the battery mount troublesome. Moreover, it is often rather loud in environments where cinematographic filming takes place, such that a quiet clicking sound to signify proper engagement between the battery and the battery mount may not be sufficient.

The battery, system and method described herein can be used to help ensure proper engagement between a battery and a battery mount, and to indicate the proper engagement to a user thereof.

Exemplary embodiments of the present inventive concept provide a battery system 100 that facilitates proper engagement between a battery (e.g., a cinematography battery) 101 and a battery mount 200. While the battery mount 200 is typically attached or coupled to a piece of equipment (e.g., a video camera), the piece of equipment is omitted from the accompanying figures for clarity. Additionally, some portions of the features of the battery 101 and/or battery mount 200 are omitted in some of the figures for clarity.

Figure 6:
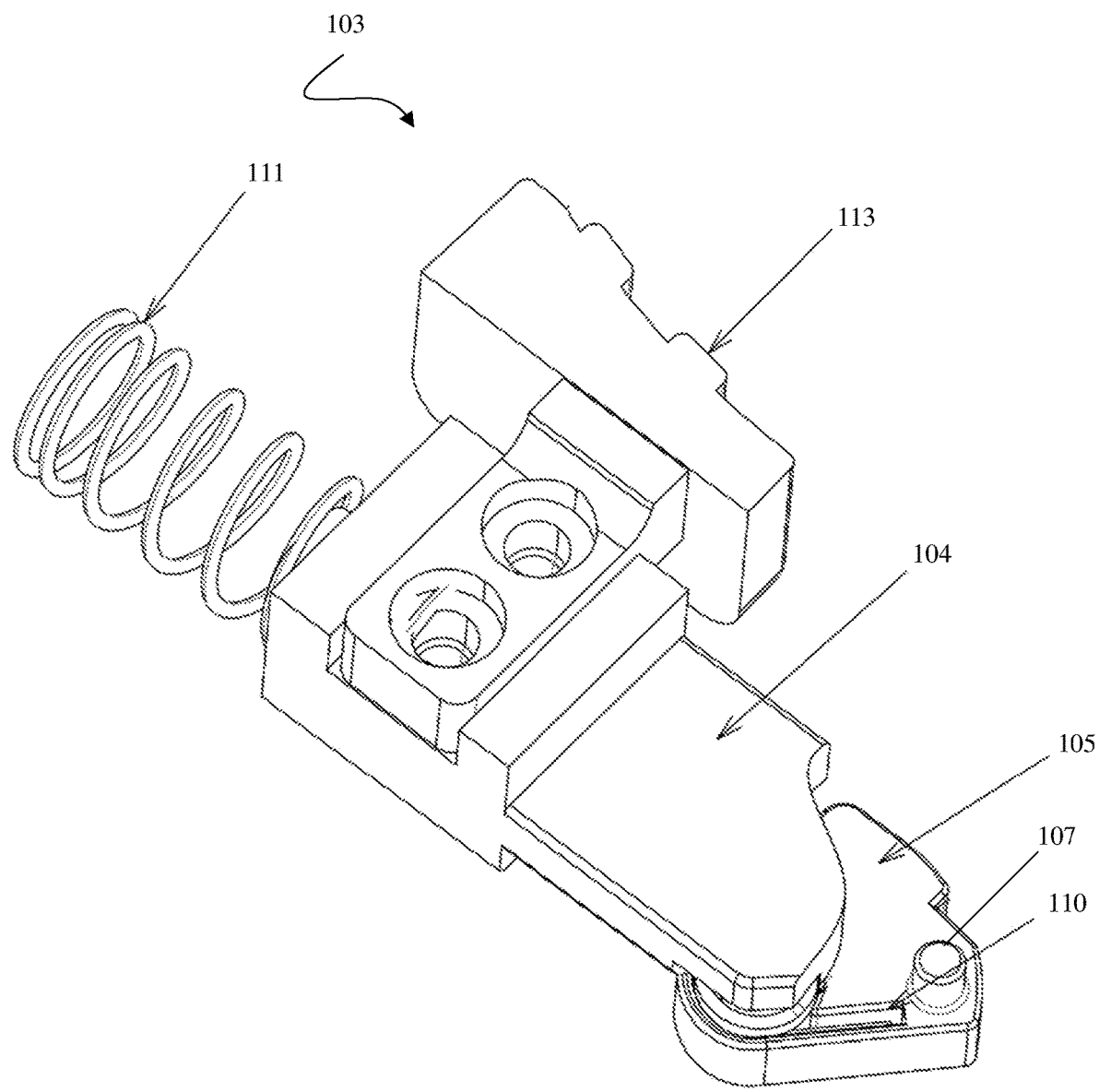
FIG. 6 is a perspective view of the mounting assembly of the cinematography battery of FIG. 1 with a portion of the body omitted.

As shown in FIG. 1, the battery 101 includes a housing 102 and a mounting assembly 103 arranged at least partially within the housing 102. With particular reference to FIG. 6, the mounting assembly 103 includes a body 104 and a block 105. As discussed in further detail below, the body 104 is configured to move relative to the housing 102. The block 105 is operably coupled to the body 104 and is configured to move relative to the body 104. Generally, the battery 101 is configured to slidably engage the battery mount 200, such that part of the mounting assembly 103 selectively engages a portion of the battery mount 200 when coupling the battery 101 to the battery mount 200.

Figure 3:
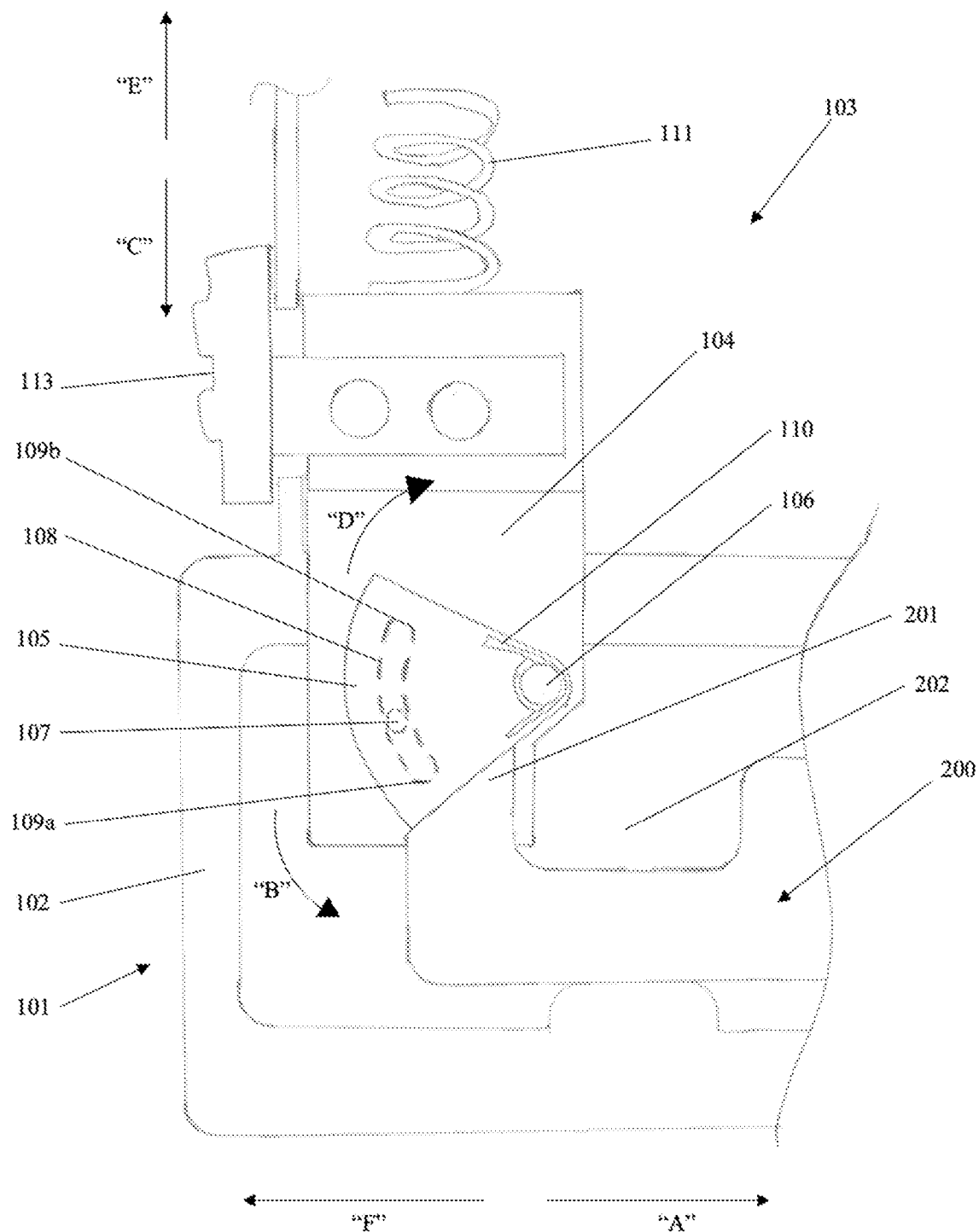
FIG. 3 is a plan view of a mounting assembly of the cinematography battery of FIG. 1 engaging the battery mount of FIG. 1.

With particular reference to FIG. 3, the interaction between the mounting assembly 103 of the battery 101 and the battery mount 200 is shown. As shown in FIG. 3, as the battery 101 moves in the general direction of arrow "A" relative to the battery mount 200, an angled foot 201 of the battery mount 200 engages the block 105 of the mounting assembly 103 of the battery 101.

The interaction between the angled foot 201 and the block 105 causes the block 105 to pivot about a pivot pin 106 relative to the body 104 of the mounting assembly 103 of the battery 101. The pivot pin 106 extends between the body 104 and the block 105. Further, the movement of the block 105 relative to the body 104 also causes a finger 107 of the block 105 to travel within a slot 108 defined in the body 104 of the mounting assembly 103. In FIG. 3, both the finger 107 and the slot 108 are shown in phantom, as the finger 107 extends downwardly from a lower surface of the block 105 (as viewed in FIG. 3), and the slot 108 is hidden from view by the block 105. The relationship between the finger 107 and the block 105 is also shown in FIG. 6 (in this view, the finger 107 is shown extending upwardly from the block 105).

While the block 105 is shown in a pivotable relationship with the body 104, other types of movement therebetween (e.g., linear movement) are also contemplated by the present disclosure. Further, while the slot 108 is shown in a curved orientation, in embodiments where the block 105 is non-pivotably moveable relative to the body 104, for instance, the slot 108 may be otherwise shaped, such as linear. Additionally, while the finger 107 is shown extending from the block 105, and the slot 108 is shown as being defined in the body 104, the finger 107 may extend from the body 104, and the slot 108 may be defined in the block 105 without departing from the scope of the present disclosure.

With continued reference to FIG. 3, the slot 108 is defined or within a portion of the body 104 of the mounting assembly 103 of the battery 101. The slot 108 defines a first end 109a and a second end 109b. In embodiments, the portion of the body 104 defining the first end 109a of the slot 108 is made from metal. Portions of the body 104 defining other portions of the slot 108 may also be made from metal. Further, the present disclosure includes embodiments where the finger 107 of the block 105 is also made from metal.

As discussed in further detail below, the engagement between the finger 107 of the block 105 and the portion of the body 104 defining a first end 109a of the slot 108 occurs when the battery 101 becomes properly engaged with the battery mount 200. Here, when the finger 107 of the block 105 and the portion of the body 104 defining the first end 109a of the slot 108 are made from metal, a relatively loud sound is produced (as compared to engagement between two plastic components, for instance), thereby alerting the user that a proper engagement has been made between the battery 101 and the battery mount 200. Additionally, a sound with a distinct tone and/or pitch may be achieved upon the engagement of two metal parts, for instance. Alternatively, the finger 107 and/or the portion of the body 104 defining the first end 109a of the slot 108 can be made from other materials, such as polymers, ceramic, glass, etc., without departing from the scope of the present disclosure.

A first biasing member 110 is shown in FIGS. 3 and 6. The first biasing member 110 is configured to bias the block 105 in the general direction of arrow "B" in FIG. 3 such that the finger 107 of the block 105 is biased toward the first end 109a of the slot 108 of the body 104. The block 105 is biased from its first position toward its second position. The first biasing member 110 is shown as a torsion spring positioned around the pivot pin 106. The present disclosure also includes the first biasing member 110 being other types of biasing members such as a compression spring, a leaf spring, etc. When the first biasing member 110 is a type of spring, the spring constant can be designed or selected to provide a desired amount of biasing force. Moreover, the value of the spring constant can help determine the speed at which the finger 107 moves, and thus the volume of sound produced when the finger 107 contacts the portion of the body 104 defining the first end 109a of the slot 108.

A second biasing member 111 is also shown in FIGS. 2-6. The second biasing member 111 is positioned between a wall 112 (FIG. 2) of the housing 102 of the battery 101 and the body 104 of the mounting assembly 103. The second biasing member 111 is configured to bias the body 104 and the block 105 of the mounting assembly 103 away from the wall 112 of the housing 102 in the general direction of arrow "C" in FIG. 3, which is generally toward the angled foot 201 of the battery mount 200 during engagement between the battery 101 and the battery mount 200. The body 104 is biased from its first position toward its second position. While the second biasing member 111 is shown as a compression spring, other types of biasing members, such as a torsion spring, a leaf spring, etc. may be used.

Further details of the engagement between the battery 101 and the battery mount 200 are shown in FIG. 3. Arrow "A" in FIG. 3 illustrates the direction in which the battery 101 moves relative to the battery mount 200 during engagement. This movement causes the angled foot 201 of the battery mount 200 to engage the block 105 of the mounting assembly 103. The engagement between the angled foot 201 and the angled wall of the block 105, and the continued movement of the battery 101 relative to the battery mount 200, causes the block 105 and the finger 107 to move or pivot in the general direction of arrow "D." More particularly, the block 105 and the finger 107 pivot about the pivot pin 106 against the bias of the first biasing member 110. During this step of the engagement process, the block 105 and the finger 107 move relative to the body 104 of the mounting assembly 103, and the block 105 and the finger 107 move relative to the housing 102 of the battery 101. Further, the body 104 of the mounting assembly 103 slides behind the angled foot 201 of the battery mount 200 (in the general direction of arrow "A"), and initially remains stationary relative to the housing 102 of the battery 101. That is, there is not yet a force opposing the force enacted by the second biasing member 111. Moreover, during the stage of the engagement shown in FIG. 3, the finger 107 of the block 105 is positioned near the middle of the slot 108 of the body 104.

Continued movement of the battery 101 relative to the battery mount 200 in the direction of arrow "A" causes the angled foot 201 of the battery mount 200 to move the block 105 of the mounting assembly 103 an additional distance in the general direction of arrow "D." After a predetermined amount of movement of the battery 101 relative to the battery mount 200, the block 105 moves or pivots relative to the body 104 a sufficient amount such that the finger 107 of the block 105 is positioned at the second end 109b of the slot 108 of the body 104. In this position, and as the battery 101 continues to move in the general direction of arrow "A" relative to the battery mount 200, the engagement between the angled foot 201 and the block 105 causes both the block 105 and the body 104 to move relative to the housing 102 of the battery 101 in the general direction of arrow "E" against the bias of the second biasing member 111. That is, since the finger 107 of the block 105 is at the second end 109b of the slot 108 of the body 104, the block 105 can no longer move (e.g., pivot or rotate) in that direction relative to the body 104. Thus, the force imparted on the block 105 by the angled foot 201 causes the block 105 and the body 104 to move relative to the housing 102 of the battery 101. This movement of the body 104 relative to the housing 102 of the battery 101 causes compression of the second biasing member 111.

Further movement of the battery 101 relative to the battery mount 200 in the direction of arrow "A" causes the block 105 of the mounting assembly 103 of the battery 101 to move past and out of engagement with the angled foot 201 of the battery mount 200. Here, since the block 105 is no longer in contact with the angled foot 201, the angled foot 201 is no longer resisting the force provided by the first biasing member 110 or the second biasing member 111.

Thus, the first biasing member 110 urges the block 105 to move (e.g., pivot or rotate) relative to the body 104 in the general direction of arrow "B" such that the finger 107 of the block 105 moves within the slot 108 of the body 104 from its second position toward its first, biased position. More particularly, the finger 107 of the block 105 moves through the slot 108 of the body 104 such that the finger 107 contacts the portion of the body 104 defining the first end 109a of the slot 108. Further, in embodiments where the finger 107 and/or the portion of the body 104 defining the first end 109a of the slot 108 are made from metal, an audible sound is produced. Moreover, at least a portion of the block 105 moves within a groove 202 of the battery mount 200.

Additionally, the second biasing member 111 urges the body 104 to move (e.g., linearly) relative to the housing 102 of the battery 101 in the general direction of arrow "C." Further, since the block 105 is disposed on the body 104, movement of the body 104 relative to the housing 102 of the battery 101 also results in a corresponding movement of the block 105 relative to the housing 102. Thus, the block 105 moves (e.g., pivots or rotates) in the general direction of arrow "B" relative to the housing 102, and, at the same time, the block 105 moves (e.g., linearly) in the general direction of arrow "C" relative to the housing 102. In this position, where at least a portion of the block 105 is within the groove 202 of the battery mount 200, the battery 101 is securely engaged with the battery mount 200.

Figure 4:
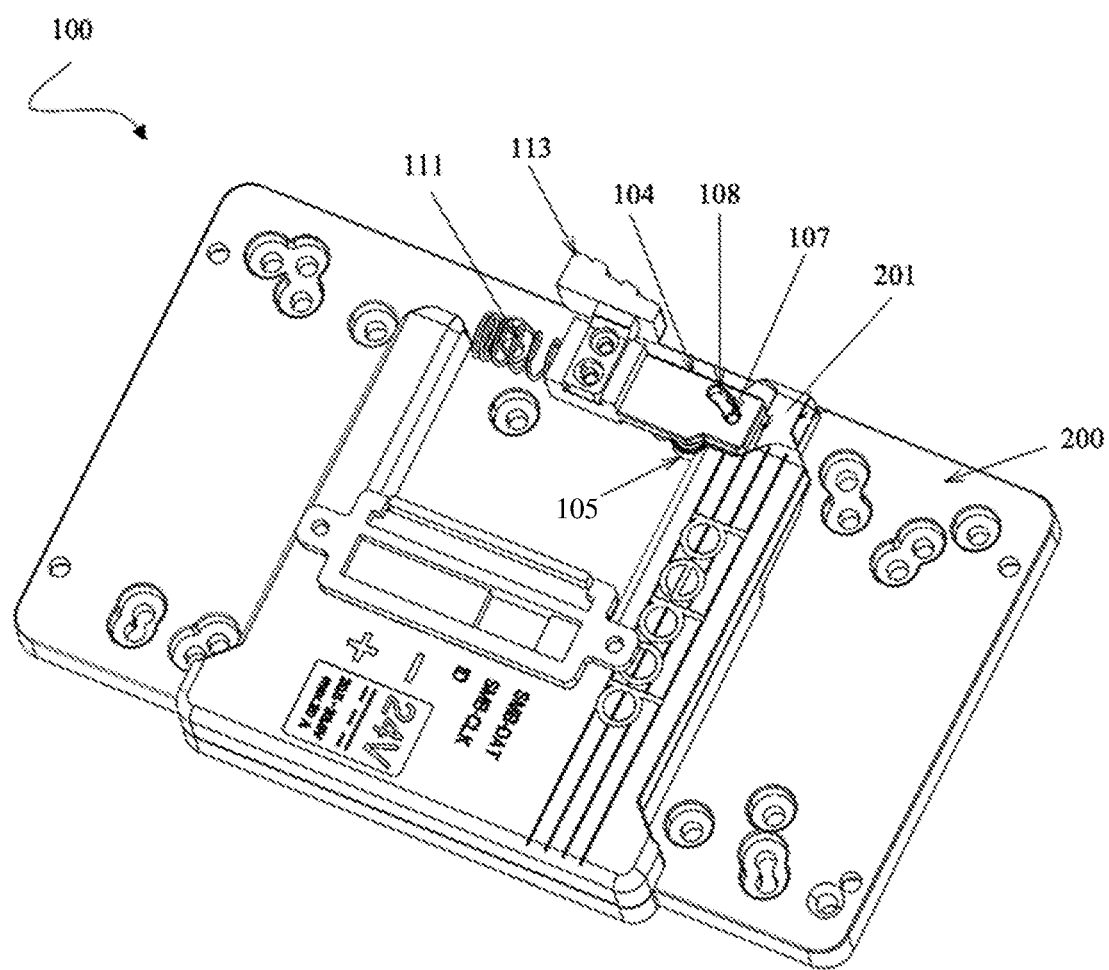
FIG. 4 is a perspective view of the mounting assembly of the cinematography battery of FIG. 1 engaged with the battery mount of FIG. 1, where the housing of the cinematography battery is omitted.
Figure 5:
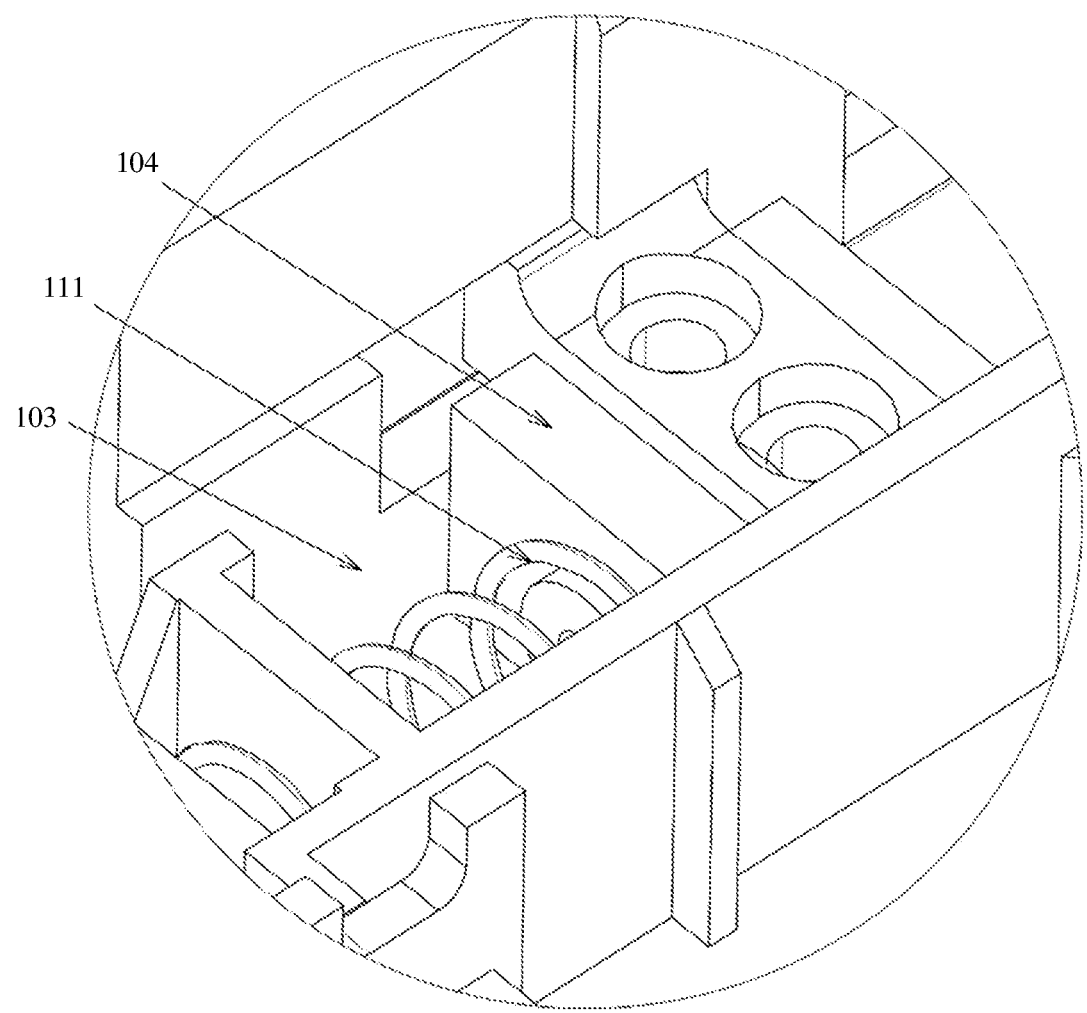
FIG. 5 is enlarged view of the area indicated in FIG. 1.

Referring now to FIG. 4, to remove the battery 101 from engagement with the battery mount 200, a user can move a slide 113 in the general direction of arrow "E," against the bias of the second biasing member 111. This movement of the slide 113 relative to the battery mount 200 causes the body 104 to move in the general direction of arrow "E" (FIG. 3) relative to the housing 102 of the battery, thereby moving the block 105 out of its position within the groove 202 of the battery mount 200. This allows the battery 101 to move in the generally direction of arrow "F" (FIG. 3) relative to the battery mount 200, thereby disengaging the battery 101 from the battery mount 200.

Battery mounts or mount plates having different mounting arrangements for connecting with different types of batteries are described in U.S. Pat. No. 10,197,630, the entire contents of which are incorporated by reference herein. A battery mount or mount plate having various features is described in U.S. Pat. No. 10,841,492, the entire contents of which are incorporated by reference herein.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A cinematography battery, comprising:
   a housing; and
   a mounting assembly disposed at least partially within the housing, the mounting assembly including:
      a body configured to slide longitudinally relative to the housing; and
      a block rotatably coupled to the body,
   wherein the block is configured to rotate with respect to the body as the body is slid longitudinally to selectively engage a battery mount to couple the cinematography battery to the battery mount, wherein longitudinally sliding the body and rotating the block with respect to the body generates a clicking sound as the cinematography battery is selectively engaged with the battery mount.

2. The battery of claim 1, wherein the block is pivotable about a pin disposed on the body.

3. The battery of claim 1, wherein the block includes a finger configured to slidably engage a slot defined in the body.

4. The battery of claim 3, wherein the slot forms a curved path.

5. The battery of claim 3, wherein the finger of the block is made from metal.

6. The battery of claim 5, wherein a portion of the body defining a first end of the slot is made from metal.

7. The battery of claim 6, wherein the mounting assembly includes a first biasing member biasing the finger of the block toward the first end of the slot.

8. The battery of claim 7, wherein the mounting assembly includes a second biasing member biasing the body in a first direction relative to the housing.

9. A cinematography battery configured to selectively engage a battery mount, the cinematography battery comprising:
   a housing; and
   a mounting assembly disposed at least partially within the housing, the mounting assembly including:
      a body configured to slide longitudinally relative to the housing; and
      a block disposed on the body, wherein the block is pivotable relative to the body,
   wherein the block is configured to pivot with respect to the body as the body is slid longitudinally to selectively engage a battery mount to couple the cinematography battery to the battery mount, wherein longitudinally sliding the body and pivoting the block with respect to the body generates a clicking sound as the cinematography battery is selectively engaged with the battery mount.

10. The battery of claim 9, wherein the mounting assembly includes a first biasing member biasing the block.

11. The battery of claim 10, wherein the mounting assembly includes a second biasing member biasing the body, the first biasing member movable relative to the second biasing member.

12. The battery of claim 9, wherein the block includes a finger configured to slidably engage a slot defined in the body.

13. The battery of claim 12, wherein the mounting assembly includes a first biasing member biasing the block toward a first position, wherein when the block is in the first position, the finger is in contact with a portion of the body defining a first end of the slot, and wherein an audible sound is made when the finger makes contact with the portion of the body defining the first end of the slot.

* * * * *